United States Patent
Imase

(10) Patent No.: US 10,427,969 B2
(45) Date of Patent: Oct. 1, 2019

(54) METHOD OF MANUFACTURING OPTICAL FIBER

(71) Applicant: Fujikura Ltd., Tokyo (JP)

(72) Inventor: Akihito Imase, Sakura (JP)

(73) Assignee: FUJIKURA LTD., Tokyo (JP)

( * ) Notice: Subject to any disclaimer, the term of this patent is extended or adjusted under 35 U.S.C. 154(b) by 11 days.

(21) Appl. No.: 15/514,679

(22) PCT Filed: Aug. 10, 2016

(86) PCT No.: PCT/JP2016/073509
§ 371 (c)(1),
(2) Date: Mar. 27, 2017

(87) PCT Pub. No.: WO2017/026498
PCT Pub. Date: Feb. 16, 2017

(65) Prior Publication Data
US 2017/0217822 A1 Aug. 3, 2017

(30) Foreign Application Priority Data
Aug. 11, 2015 (JP) .................................. 2015-158823

(51) Int. Cl.
*C03B 37/025* (2006.01)
*C03B 37/027* (2006.01)

(52) U.S. Cl.
CPC .... *C03B 37/0253* (2013.01); *C03B 37/02718* (2013.01); *C03B 2205/56* (2013.01); *C03B 2205/72* (2013.01); *Y02P 40/57* (2015.11)

(58) Field of Classification Search
CPC .................... C03B 37/02718; C03B 37/02727
See application file for complete search history.

(56) References Cited

U.S. PATENT DOCUMENTS 5,603,168 A * 2/1997 McMahon, Jr. ...... F26B 13/005
34/212
2001/0006262 A1 7/2001 Dubois et al.
(Continued)

FOREIGN PATENT DOCUMENTS

EP 0464613 A1 1/1992
EP 1205449 A1 5/2002
(Continued)

OTHER PUBLICATIONS

Singh, "Process Control Concepts, Dynamics, and Applications", PHI Learning Private Limited, 2009, pp. 63 and 64. (Year: 2009).*
(Continued)

*Primary Examiner* — Lisa L Herring
(74) *Attorney, Agent, or Firm* — Westerman, Hattori, Daniels & Adrian, LLP

(57) ABSTRACT

An optical fiber manufacturing method includes: melting and drawing an optical fiber preform to form a glass fiber; cooling the glass fiber while inserting the glass fiber into a tubular slow-cooling device from an inlet end toward an outlet end thereof; and lowering an inner wall temperature of the slow-cooling device below a temperature of the glass fiber and providing a pressure gradient in which a pressure increases in a direction from the inlet end toward the outlet end inside the slow-cooling device when cooling the glass fiber, wherein the average pressure change dP/dL in a moving direction of the glass fiber inside the slow-cooling device satisfies the following Formula (1) when the tube inner diameter of the slow-cooling device is defined as D [m] and the length of an internal space of the slow-cooling device in the moving direction of the glass fiber is defined as L [m].

$$(\pi D^2/4) \times dP/dL \leq 0.03 \quad (1)$$

6 Claims, 4 Drawing Sheets

(56) References Cited

U.S. PATENT DOCUMENTS

| | | |
|---|---|---|
| 2005/0281521 A1 | 12/2005 | Oku et al. |
| 2006/0280578 A1* | 12/2006 | Shiono ................. C03B 37/029 411/542 |
| 2014/0226948 A1* | 8/2014 | Enomoto .......... C03B 37/02727 385/147 |
| 2015/0101368 A1 | 4/2015 | Uenoyama et al. |
| 2015/0251945 A1 | 9/2015 | Nakanishi et al. |
| 2016/0168008 A1* | 6/2016 | Bookbinder ...... C03B 37/02727 428/364 |

FOREIGN PATENT DOCUMENTS

| | | |
|---|---|---|
| EP | 1243568 A1 | 9/2002 |
| JP | 51-89747 A | 8/1976 |
| JP | 60-186430 A | 9/1985 |
| JP | 4-59631 A | 2/1992 |
| JP | 9-40436 A | 2/1997 |
| JP | 10-25127 A | 1/1998 |
| JP | 4356154 B2 | 11/2009 |
| JP | 4459720 B2 | 4/2010 |
| JP | 4482955 B2 | 6/2010 |
| JP | 4558368 B2 | 10/2010 |
| JP | 4990429 B2 | 8/2012 |
| JP | 2013-35742 A | 2/2013 |
| JP | 2013-529174 A | 7/2013 |
| JP | 2014-62021 A | 4/2014 |
| JP | 2014-208578 A | 11/2014 |
| JP | 2015-74590 A | 4/2015 |
| WO | 2011/150056 A1 | 12/2011 |

OTHER PUBLICATIONS

Sakaguchi et al., "Rayleigh scattering of silica core optical fiber after heat treatment", Applied. Optics, 1998, vol. 37, pp. 7708-7711 cited in the specification (4 pages).

Saito et al., "Limit of the Rayleigh scattering loss in silica fiber, Applied Physics Letters", 2003, vol. 83, pp. 5175-5177 cited in the specification (3 pages).

Saito et al., "Control of Glass-Forming Process During Fiber-Drawing to Reduce the Rayleigh Scattering Loss", J. Am. Ceram. Soc., 2006, vol. 89, pp. 65-69 cited in the specification (5 pages).

Kim et al., "Fictive temperature of silica glass optical fibers—re-examination", Journal of Non-Crystalline Solids, 2001, vol. 286, pp. 132-138 cited in the specification (7 pages).

Tsujikawa et al., "Method for Predicting Rayleigh Scattering Loss of Silica-Based Optical Fibers", Journal of Lightwave Technology, 2007, vol. 25, pp. 2122-2128 cited in the specification (7pages).

Extended Europen Search Report dated May 23, 2018, issued in counterpart application No. 16835195.5. (7 pages).

* cited by examiner

METHOD OF MANUFACTURING OPTICAL FIBER

TECHNICAL FIELD

The present invention relates to a method of manufacturing an optical fiber.

This application claims priority from Japanese Patent Application No. 2015-158823, filed on Aug. 11, 2015, the contents of which are incorporated herein by reference in their entirety.

BACKGROUND ART

An optical signal to noise ratio (OSNR) needs to be increased to increase an optical transmission distance and transmission speed. Therefore, an optical fiber is required to have low loss characteristics.

A silica core optical fiber, whose core region is substantially formed of only pure silica glass, has no light scattering due to fluctuation of added $GeO_2$ concentration compared to a germa-core optical fiber (an optical fiber doped with $GeO_2$ in the core). Therefore, it is known to be an optical fiber with low loss.

A demand for even lower loss is still high for both silica core optical fibers and germa-core optical fibers.

Recently, technologies of manufacturing optical fibers have become highly sophisticated, and absorption loss due to impurities such as metal oxides ($MO_x$) or hydroxyl groups (OH) in optical fibers has almost been reduced to the limit. Most of the remaining loss is due to scattering loss accompanied by fluctuation of a structure or composition of the glass. Since the optical fiber is formed of glass, such a loss is inevitable.

Generally, it is well known in the glass industry that the fluctuation can be reduced by cooling a melt molded glass gently. Also in methods of manufacturing an optical fiber, for the optical fiber immediately after an optical fiber preform is melted and drawn by a heating furnace, methods such as adjusting the temperature using a separate furnace (a slow-cooling furnace) or slowly lowering the temperature by adding an insulating structure to the heating furnace have been studied. In such methods, an effect has been obtained to a certain degree (see Patent Documents 1 to 8 and Non-Patent Documents 1 to 5).

In addition, a method of efficiently performing the slow cooling of an optical fiber passing through a slow-cooling furnace by selecting a low thermal conductivity gas as the atmosphere inside the slow-cooling furnace has also been studied (see Patent Documents 9 and 10).

PRIOR ART DOCUMENTS

Patent Documents

[Patent Document 1] Japanese Unexamined Patent Application, First Publication No. S51-089747
[Patent Document 2] Japanese Unexamined Patent Application, First Publication No. S60-186430
[Patent Document 3] Japanese Unexamined Patent Application, First Publication No. H04-059631
[Patent Document 4] Japanese Unexamined Patent Application, First Publication No. H10-025127
[Patent Document 5] Japanese Patent No. 4482955
[Patent Document 6] Japanese Patent No. 4558368
[Patent Document 7] Japanese Patent No. 4990429
[Patent Document 8] Japanese Unexamined Patent Application, First Publication No. 2014-062021
[Patent Document 9] Japanese Patent No. 4356154
[Patent Document 10] Japanese Patent No. 4459720

Non-Patent Documents

[Non-Patent Document 1] S. Sakaguchi and S. Todoroki. Appl. Optics, Vol. 37, pp. 7708-7711 (1998)
[Non-Patent Document 2] K. Saito, et al., Appl. Phys. Lett., Vol. 83, pp. 5175-5177 (2003)
[Non-Patent Document 3] K. Saito, et al., J. Am. Ceram. Soc., Vol. 89, pp. 65-69 (2006)
[Non-Patent Document 4] D.-L. Kim and M. Tomozawa, J. Non-Cryst. Solid, Vol. 286, pp. 132-138 (2001)
[Non-Patent Document 5] K. Tsujikawa, et al., J. Lightwave Technol., Vol. 25, pp. 2122-2128 (2007)

SUMMARY OF INVENTION

Problems to be Solved by the Invention

However, thermal conductivity of an atmosphere gas and He gas is simply compared in a manufacturing method using a low thermal conductivity gas as the atmosphere gas in a slow-cooling furnace, which is merely using a gas selected based on relative degrees in thermal conductivity, and a detailed study of heat migration has not been conducted.

Also, in conventional manufacturing methods, a facility having a heating element or insulating structure is required to effectively perform the slow cooling, and problems such as complicated facilities, increased power consumption, reduced productivity, and the like are unavoidable.

In order to perform slow cooling, adding a structure for slow cooling to the heating furnace which heats a preform to draw a fiber can be considered, but a sufficient slow-cooling effect is not obtainable when the structure for slow cooling is a simple tubular structure and the effect of reducing transmission loss is insufficient.

The invention is made in consideration of the above-mentioned circumstances and directed to providing a method of manufacturing an optical fiber capable of slow-cooling a bare optical fiber and reducing the transmission loss without complicating apparatus configuration.

Means for Solving the Problems

One aspect of the invention provides a method of manufacturing an optical fiber including melting and drawing an optical fiber preform to form a glass fiber (drawing step), cooling the glass fiber while inserting the glass fiber into a tubular slow-cooling device from an inlet end toward an outlet end thereof (slow cooling step), and lowering an inner wall temperature of the slow-cooling device below the temperature of the glass fiber and providing a pressure gradient in which a pressure increases in a direction from the inlet end toward the outlet end inside the slow-cooling device when cooling the glass fiber (in the slow cooling step), wherein an average pressure change dP/dL in a moving direction of the glass fiber inside the slow-cooling device satisfies the following Equation 1 when a tube inner diameter of the slow-cooling device is defined as D [m] and the length of an internal space of the slow-cooling device in the moving direction of the glass fiber is defined as L [m].

$$(\pi D^2/4) \times dP/dL \leq 0.03 \quad \text{[Equation 1]}$$

In one aspect of the invention, the average pressure change dP/dL may satisfy the following Equation 2.

[Equation 2]

$$0 \leq \log\left(\frac{dP}{dL}\right) \leq -2.8\log D - 2.6$$

In one aspect of the invention, by adjusting at least one of a flow rate of a fluid introduced into the slow-cooling device and an opening degree of the outlet of the slow-cooling device, the pressure gradient may be provided inside the slow-cooling device.

In one aspect of the invention, the pressure gradient inside the slow-cooling device is measured, the measured value of the pressure gradient and a preset reference value of the pressure gradient are compared, and at least one of the flow rate of the fluid introduced into the slow-cooling device and an opening degree of the outlet of the slow-cooling device may be controlled such that the difference between the measured value and the preset reference value of the pressure gradient decreases.

Effects of the Invention

According to one aspect of the invention, since a pressure gradient in which a pressure increases in a direction from the inlet end toward the outlet end is provided inside a slow-cooling device, the flow velocity of a fluid (in a moving direction of a glass fiber) in a tube can be decreased.

When the flow velocity of the fluid is decreased, heat transfer between the fluid and the inner wall of the tube is decreased. Therefore, heat of the fluid can be prevented from escaping to the outside and the temperature of the fluid can be maintained at a high temperature. Thus, the heat transfer between the glass fiber and the fluid can be gently performed. Accordingly, a slow-cooling effect is sufficiently obtained and an optical fiber with low transmission loss can be manufactured.

In addition, a technique used in this method is not bringing the temperature of the fluid close to the temperature of the glass fiber by heating the fluid, but bringing the temperature of the fluid close to a temperature of the glass fiber by preventing heat of the fluid from escaping to the outside. Therefore, the above-described effect can be obtained without using a heat source (or using a simple heat source). Thus, the apparatus configuration is prevented from being complicated.

EMBODIMENTS FOR CARRYING OUT THE INVENTION

It is known that the flow of a fluid inside a tube becomes a laminar flow when the Reynolds number Re generally defined by the following Formula (1) is less than the range of 2,300 to 4,000.

[Equation 3]

$$Re = \frac{\rho u L}{\mu} \quad (1)$$

In Formula (1), $\rho$ represents the density of a fluid [kg/m³], u represents the velocity of the fluid [m/s], L represents the characteristic length of the system [m], and $\mu$ represents the viscosity of the fluid [Pa·s].

When Re is sufficiently small and a laminar flow can be assumed as the flow of the fluid in the tube, the velocity distribution of the fluid in the tube satisfies the following Formulas (2) and (3).

[Equation 4]

$$\frac{du}{dr} = -\frac{1}{\mu}\tau_{rz} \quad (2)$$

[Equation 5]

$$\frac{d}{dr}\tau_{rz} = -\frac{dp}{dz} - \frac{1}{r}\tau_{rz} \quad (3)$$

In Formulas (2) and (3), r represents a position in a radial direction inside the tube [m], $\tau_{rz}$ represents a shear stress in an axial direction of a plane perpendicular to the radial direction inside the tube [Pa], and dp/dz represents a pressure gradient in the axial direction inside the tube [Pa/m].

In a system in which the flow of a fluid in the tube is caused only by a pressure gradient in an axial direction (a so-called Hagen-Poiseuille flow), the velocity distribution of the fluid in the tube exhibits a general parabolic velocity distribution. However, conditions become different in a tube through which a glass fiber passes, where the velocity distribution becomes different from the above-described general parabolic velocity distribution.

Hereinafter, it is assumed that a glass fiber moves inside a tube along a central axis thereof.

The flow of a fluid in a moving direction of the glass fiber is generated inside the tube due to a viscous force generated mainly in the fluid flowing through a position near the glass fiber. On the other hand, either downward flow or upward flow can be generated according to a pressure gradient inside the tube at a position near the inner wall of the tube. An example of the velocity distribution of a fluid in a tube which satisfies the above Formulas (2) and (3) is shown in FIG. 2.

Figure 2:
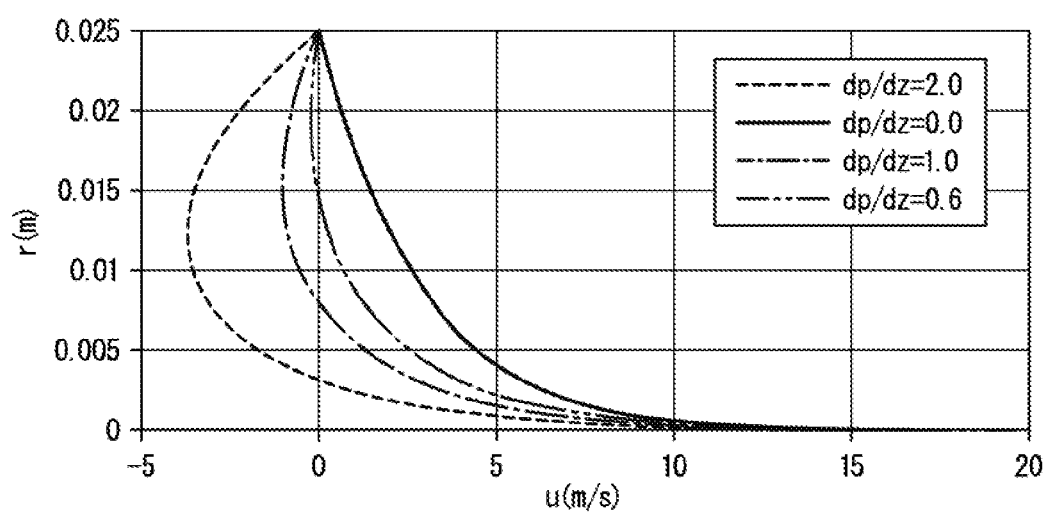
FIG. 2 is a diagram showing calculated values of a velocity distribution of a fluid in a slow-cooling device used in the manufacturing apparatus shown in FIG. 1.

FIG. 2 shows calculated values of the velocity distribution of a fluid in a radial direction of the tube when a drawing velocity is 1,000 m/min (16.67 m/s), a tube diameter (an inner diameter) is 0.05 m, and an atmosphere gas in the tube is He. Each of the multiple curves shown in FIG. 2 is a trial calculation result when the pressure gradient dp/dz in the tube is different.

In principle, the velocity of the fluid at the inner wall of the tube (r=0.025 m) is 0 m/s and the velocity of the fluid at the center of the tube (r=0 m) through which a glass fiber passes coincides with the moving speed of the glass fiber.

At an intermediate position (at approximately 0.01 m in radius, for example) between the inner wall of the tube and the center of the tube, the velocity of the fluid is highly dependent on the pressure gradient dp/dz in the axial direction and the fluid may flow either downward or upward. It may substantially become almost quiescent.

For example, as shown in FIG. 2, when the pressure gradient dp/dz inside the tube is zero, the flow of the fluid (downward flow) in the moving direction of the glass fiber (to the right in FIG. 2) is largely increased, whereas the flow of the fluid in the same direction is decreased when the pressure gradient dp/dz in the tube is greater than zero. When the pressure gradient dp/dz is 0.6, the flow velocity of the fluid at a region close to the inner wall of the tube (a region at which r is 0.015 or more) becomes very small, for example.

On the other hand, heat transfer between a solid and a fluid flowing through a position near the solid follows the following Formula (4).

[Equation 6]

$$Q = h(T_w - \bar{T})A \tag{4}$$

Q represents an amount of heat per unit time [W] and h represents a convective heat transfer rate [W/K·m$^2$]), which are dependent on the system. A represents a contact area [m$^2$]. $T_w$ represents a surface temperature [K] of the solid. T-bar represents an average temperature [K] of the fluid.

Formula (4) can be applied to heat exchange between the glass fiber and the surrounding fluid and also between the inner wall of the tube and the fluid flowing therethrough. Formula (4) expresses that heat transfer between the solid and the fluid is proportional to a temperature difference between the solid and the fluid.

Since the convective heat transfer rate h depends not only on properties of the fluid but also on the system, it needs to be discussed for the individual system. h is generally expressed as in the following Formula (5).

[Equation 7]

$$h = cku^m d^{m-1} v^{n-m} \alpha^{-n} \tag{5}$$

c represents a proportional constant, k represents the thermal conductivity of the fluid [W/K·m], d represents the representative length of the system [m], v represents the kinematic viscosity coefficient [m$^2$·s] of the fluid (v=μ/ρ, and α represents the thermal diffusivity [m$^2$/s] of the fluid (α=k/ρCp . Each of m and n is dependent on the system, where m falls within the range of 0.5 to 0.8 and n falls within the range of 0.2 to 0.5.

As described above, heat transfer between a glass fiber and the surrounding fluid can be described as follows.

[1] In order to gently perform heat transfer between the glass fiber and the surrounding fluid, a temperature difference between the surrounding fluid and the glass fiber needs to be decreased.

[2] In order to gently perform heat transfer between the glass fiber and the surrounding fluid, a relative speed of the glass fiber and the fluid needs to be reduced.

In order to realize [2] above, a drawing velocity of the glass fiber needs to be reduced.

In order to realize [1] above, a technique of heating the fluid to bring the temperature of the fluid closer to the temperature of the glass fiber may be used, but a technique of preventing heat of the fluid from escaping to the outside can also be used.

Q in Formula (4) can be rewritten as follows.

[Equation 8]

$$Q_{gas} = h_{gas\text{-}wall}(T_{wall} - T_{gas})d_{wall}\pi\Delta l + h_{fiber\text{-}gas}(T_{fiber} - T_{gas})d_{fiber}\pi\Delta l \tag{6}$$

When a tube line is assumed to be divided into sections by a minute length Δl in a traveling direction of the glass fiber, Formula (6) expresses heat exchange between the inner wall of the tube and the fluid in the range of the section. In Formula (6), heat transfer in a longitudinal direction of the tube line or a temperature distribution of the fluid in the section is ignored.

$T_{wall}$, $T_{fiber}$, and $T_{gas}$ respectively represent a temperature [K] of the inner wall of the tube, the glass fiber, and the fluid. $Q_{gas}$ represents an amount of heat [W] added to the fluid per unit time. $h_{gas\text{-}wall}$ represents a convective heat transfer rate [W/K·m$^2$] between the fluid and the inner wall of the tube. $h_{fiber\text{-}gas}$ represents a convective heat transfer rate [W/K·m$^2$] between the fluid and the glass fiber. $d_{wall}$ represents a diameter [m] of the inner wall. $d_{fiber}$ represents a diameter [m] of the glass fiber.

In the right-hand side of Formula (6), the temperature of the glass fiber, the temperature of the fluid, and the temperature of the inner wall of the tube at each point in the tube line are almost constant in a steady state during the fiber drawing and $Q_{gas}$ in Formula (6) becomes zero. At this time, $T_{gas}$ satisfying $Q_{gas}$=0 is uniquely determined when $T_{wall}$ and $T_{fiber}$ are determined.

When $T_{fiber}$>$T_{gas}$>$T_{wall}$ is assumed, an absolute value of the first term on the right-hand side of Formula (6) needs to be decreased in order to bring $T_{gas}$ close to $T_{fiber}$. When the first term of the right-hand side of Formula (6) is set as $Q_{gas\text{-}wall}$ and Formula (5) is substituted for $h_{gas\text{-}wall}$ the following Formula (7) can be obtained.

[Equation 9]

$$Q_{gas\text{-}wall} = Cku^m d_{wall}^m v^{n-m} \alpha^n (T_{wall} - T_{gas})\Delta l\pi \tag{7}$$

In Formula (7), an absolute value of $Q_{gas\text{-}wall}$ is decreased when the velocity of the fluid u is decreased or when $T_{wall}$ and $T_{gas}$ are approximated.

As shown in FIG. 2, the flow velocity of the fluid inside the tube (in a moving direction of the glass fiber) can be decreased when a gradient increasing in a direction toward an outlet end from an inlet end is provided to the pressure in the tube.

As expressed in Formula (7), heat transfer between the fluid and the inner wall of the tube is decreased when the velocity of the fluid is decreased. Therefore, heat of the fluid can be prevented from escaping to the outside and a temperature of the fluid can be maintained at high temperature. Accordingly, heat transfer between the glass fiber and the fluid can be gently performed (see [1] described above).

Therefore, a slow-cooling effect is sufficiently obtained and an optical fiber with low transmission loss can be manufactured.

Also, a technique used in this method is not bringing the temperature of the fluid close to the temperature of the glass fiber by heating the fluid, but bringing the temperature of the fluid close to the temperature of the glass fiber by preventing heat of the fluid from escaping to the outside. Therefore, the above-described effect can be obtained without using a heat source (or using a simple heat source). Thus, the apparatus configuration is prevented from being complicated.

Figure 1:
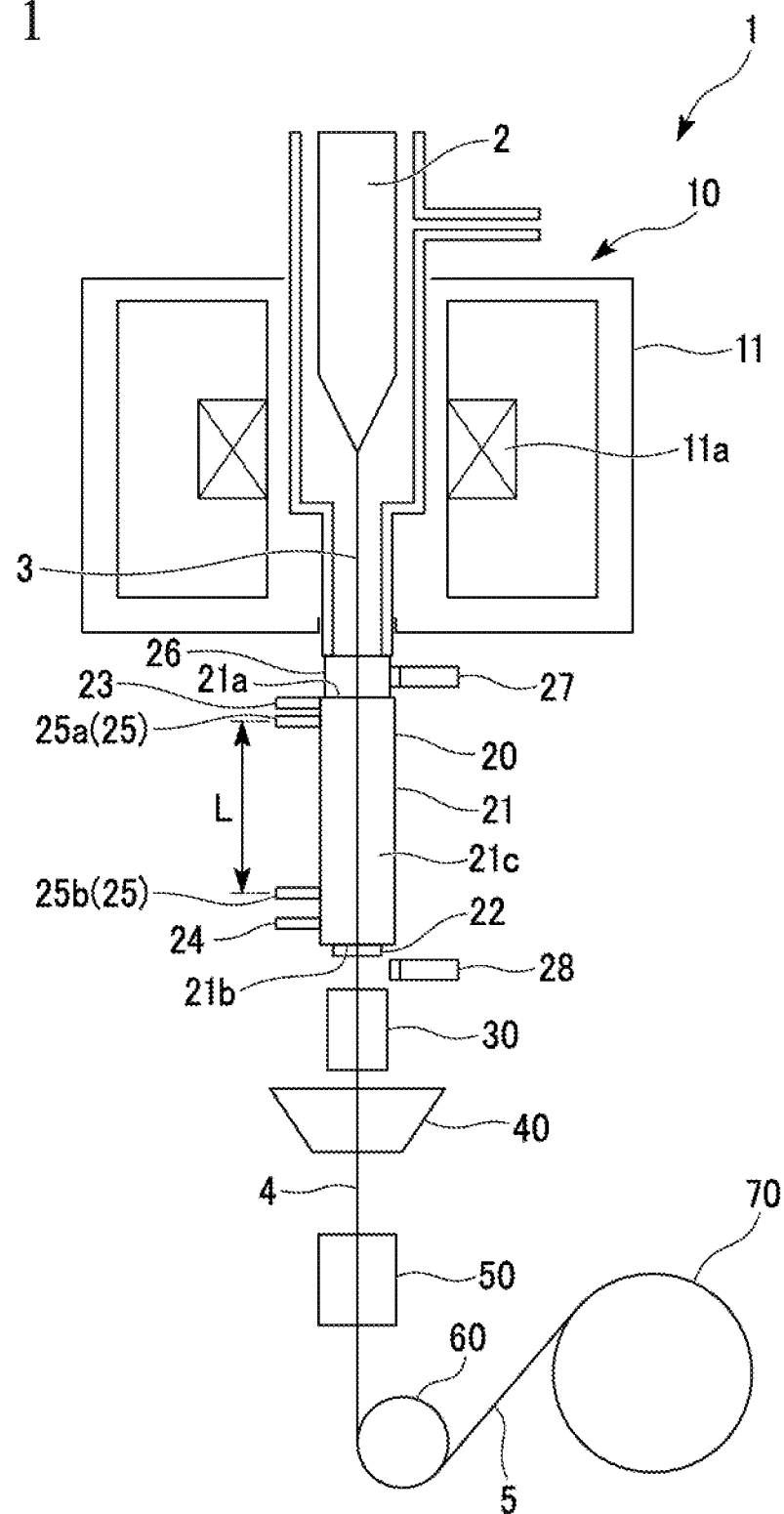
FIG. 1 is a schematic view showing a schematic configuration of a manufacturing apparatus capable of implementing an example of a method of manufacturing an optical fiber according to one embodiment of the invention.

FIG. 1 is a schematic view showing a schematic configuration of a manufacturing apparatus 1 capable of implementing an example of a method of manufacturing an optical fiber according to one embodiment of the invention.

The manufacturing apparatus 1 includes a drawer 10, a slow-cooling device 20, a forced cooler 30, a coater 40, a curing unit 50, a folding pulley 60, and a winder 70 from the upstream side to the downstream side in a fiber drawing direction.

The drawer 10 includes a heating furnace 11 having a heat source 11a, and an optical fiber preform 2 is heated by the heating furnace 11, melted, and drawn so that a glass fiber 3 (a bare optical fiber) is obtained.

The slow-cooling device 20 includes a main body 21 having a tubular structure and a constrictor 22 provided at a lower end 21b of the main body 21.

The constrictor 22 has an opening (not shown in figure) through which the glass fiber 3 can pass. The constrictor 22 can adjust an inner diameter of the opening and thereby a pressure gradient inside the slow-cooling device 20 can be adjusted.

It is preferable that the central axis of the main body 21 be aligned with a vertical direction. The main body 21 is connected to a lower end of the heating furnace 11 with a connection cylinder 26 interposed therebetween.

The slow-cooling device 20 may have a configuration without a heat source, or may have a configuration in which a heat source for heating the inside of the main body 21 is provided.

It is preferable that the inside of the slow-cooling device 20 be filled with a fluid (a low thermal conductivity gas, air, or the like). The low thermal conductivity gas is a gas having lower thermal conductivity than He. As the lower conductivity gas, Ar or $N_2$ can be used, for example.

A gas inlet/outlet portion 23 that is used to introduce or discharge the low thermal conductivity gas into/from the main body 21 is provided at a position near an inlet end 21a (an upper end) of the main body 21. A gas inlet/outlet portion 24 that is used to introduce or discharge the gas into/from the main body 21 is provided at a position near the outlet end 21b (a lower end) of the main body 21.

In the main body 21, a plurality of connection ports 25 (25a and 25b) that are used to connect pressure gauges are provided at intermediate positions in an axial direction (positions between the upper end and the lower end). In FIG. 1, two connection ports 25 (25a and 25b) are provided and these connection ports 25 (25a and 25b) are disposed at an interval in the axial direction of the main body 21.

The connection port 25 on the upstream side in the fiber drawing direction is referred to as a first connection port 25a and the connection port 25 on the downstream side in the fiber drawing direction is referred to as a second connection port 25b.

In FIG. 1, the first connection port 25a is positioned close to the inlet end 21a (the upper end) of the main body 21 and the second connection port 25b is positioned close to the outlet end 21b (the lower end) of the main body 21.

Also, the axial direction of the main body 21 is a central axis direction of the main body 21 and is the vertical direction in FIG. 1.

The connection ports 25a and 25b can be used to measure the pressure gradient in the axial direction in the main body 21. For example, the pressure inside the main body 21 is measured by the pressure gauges (not shown in figure) individually connected to the connection ports 25a and 25b, and a value obtained from dividing differential pressure by a distance L between the connection ports 25a and 25b (the distance in the axial direction of the main body 21) can be calculated as an average pressure gradient. The distance L is an axis distance between the connection ports 25a and 25b (tube line).

Reference numeral 27 is an inlet side radiation thermometer which is provided at the connection cylinder 26 and can measure a temperature of the glass fiber 3 (an inlet fiber temperature) immediately before it enters the slow-cooling device 20. Reference numeral 28 is an outlet side radiation thermometer which can measure a temperature of the glass fiber 3 immediately after it exits the slow-cooling device 20 (an outlet fiber temperature).

A temperature gradient of the glass fiber 3 passing through the slow-cooling device 20 can be checked by the radiation thermometers 27 and 28.

The inside of the forced cooler 30 is filled with a refrigerant (He, for example) and the glass fiber 3 can be cooled by being in contact with the refrigerant.

An optical fiber intermediate 4 is obtained in the coater 40 by coating an outer circumference of the glass fiber 3 with a coating material such as a urethane acrylate-based resin to form a coating layer.

The curing unit 50 cures the coating layer of the optical fiber intermediate 4 to form an optical fiber 5. The curing unit 50 has an ultraviolet (UV) lamp (not shown in figure), for example.

The folding pulley 60 can change a direction of the optical fiber 5.

The winder 70 is a winding bobbin that is configured to wind the optical fiber 5, for example.

Next, a method of manufacturing an optical fiber according to one embodiment of the invention will be described with reference to a case in which the manufacturing apparatus 1 is used as an example.

(Drawing Step)

As shown in FIG. 1, the optical fiber preform 2 is heated in the heating furnace 11, melted and drawn so that the glass fiber 3 is obtained in the drawer 10.

The temperature of the glass fiber 3 immediately before entering the slow-cooling device 20 can be measured by the radiation thermometer 27. The temperature of the glass fiber 3 is preferably in the range of 1,200° C. to 1,500° C.

(Slow Cooling Step)

The inside of the slow-cooling device 20 is filled with a fluid (a low thermal conductivity gas, air, or the like) in advance.

The pressure inside the main body 21 is measured by the pressure gauges (not shown in figure) individually connected to the connection ports 25a and 25b. A value ($\Delta P/L$) obtained by dividing a difference (a differential pressure $\Delta P$) between the pressure measured using the first connection port 25a and the pressure measured using the first connection port 25a by the distance between the connection ports 25a and 25b (the distance L in the axial direction in an internal space 21c of the main body 21) is calculated as the average pressure gradient. Also, the distance between the connection ports 25a and 25b is set such that the downstream direction in the fiber drawing direction (downward in FIG. 1) is normal.

As expressed in Formula (8), $\Delta P/L$ is equal to the pressure gradient $dp/dz$.

[Equation 10]

$$\frac{dP}{dz} = \frac{\Delta P}{L} \quad (8)$$

In the slow cooling step, at least one of the flow rate of the fluid (gas) introduced into the main body 21 from the gas inlet/outlet portions 23 and 24 and the inner diameter of the opening of the constrictor 22 is adjusted. Therefore, the pressure gradient increasing in a direction toward the outlet end 21b from the inlet end 21a is provided inside the slow-cooling device 20.

For example, the pressure gradient described above increases either by increasing the flow rate of the fluid (gas) introduced into the main body 21 through the gas inlet/outlet portion 24 or by decreasing the inner diameter of the opening of the constrictor 22. The pressure gradient described above is decreased either by decreasing the flow rate of the fluid (gas) introduced into the main body 21 through the gas inlet/outlet portion 24 or by increasing the inner diameter of the opening of the constrictor 22.

In the slow cooling step, an average pressure change dP/dL in the axial direction (the moving direction of the glass fiber 3) of the internal space 21c inside the main body 21 of the slow-cooling device 20 satisfies the following Formula (9). Here, D [m] represents an inner diameter (a tube inner diameter) of the main body 21 of the slow-cooling device 20, and L [m] represents the dimension in the axial direction of the internal space 21c.

[Equation 11]

$$(\pi D^2/4) \times dP/dL \leq 0.03 \quad (9)$$

Since the pressure gradient increasing from the inlet end 21a toward the outlet end 21b is provided inside the slow-cooling device 20, $(\pi D^2/4) \times dP/dL$ is greater than zero.

The flow velocity of the fluid (in the moving direction of the glass fiber) in the slow-cooling device 20 can be decreased by providing the pressure gradient increasing from the inlet end 21a toward the outlet end 21b in the slow-cooling device 20 (refer to FIG. 2).

As expressed in the above-described Formula (7), heat transfer between the fluid and the inner wall of the tube (the inner wall of the main body 21) is decreased when the velocity of the fluid u is decreased. Therefore, heat of the fluid can be prevented from escaping to the outside, and the temperature of the fluid can be maintained at a high temperature. Thus, heat transfer between the glass fiber 3 and the fluid can be gently performed (see [1] described above)

Therefore, the slow-cooling effect is sufficiently obtained and the optical fiber 5 with low transmission loss can be manufactured.

Also, a technique used in this method is not bringing the temperature of the fluid close to the temperature of the glass fiber by heating the fluid, but bringing the temperature of the fluid close to the temperature of the glass fiber by preventing heat of the fluid from escaping to the outside. Therefore, the above-described effect can be obtained without using a heat source (or using a simple heat source). Thus, the apparatus configuration is prevented from being complicated.

It is preferable that the average pressure change dP/dL satisfy the following Formula (10).

[Equation 12]

$$0.001 \leq (\pi D^2/4) \times dP/dL \leq 0.03 \quad (10)$$

Accordingly, a sufficient pressure gradient is provided in the slow-cooling device 20 and thereby the flow velocity (in the moving direction of the glass fiber) of the fluid in the slow-cooling device 20 can be decreased.

It is preferable that the average pressure change dP/dL fall within the range satisfying the following Formula (11). When the average pressure change dP/dL falls within this range, the flow velocity of the fluid in the slow-cooling device 20 is decreased and the heat transfer between the fluid and the inner wall of the tube (the inner wall of the main body 21) can be decreased.

[Equation 13]

$$0 \leq \log\left(\frac{dP}{dL}\right) \leq -2.8\log D - 2.6 \quad (11)$$

The temperature of the glass fiber 3 immediately after exiting the slow-cooling device 20 (an outlet temperature) can be measured by the radiation thermometer 28.

The temperature gradient of the glass fiber 3 passing through the slow-cooling device 20 can be checked by the radiation thermometers 27 and 28.

(Forced Cooling Step)

The glass fiber 3 can be cooled to 100° C. or less by the forced cooler 30, for example.

(Coating Step)

In the coater 40, the optical fiber intermediate 4 is obtained by coating the outer circumference of the bare optical fiber 3 with a coating material such as a urethane acrylate-based resin to form a coating layer.

(Curing Step)

In the curing unit 50, the coating layer of the optical fiber intermediate 4 is irradiated with ultraviolet rays and cured to obtain the optical fiber 5.

The optical fiber 5 is wound by the winder 70 via the folding pulley 60.

Figure 3:
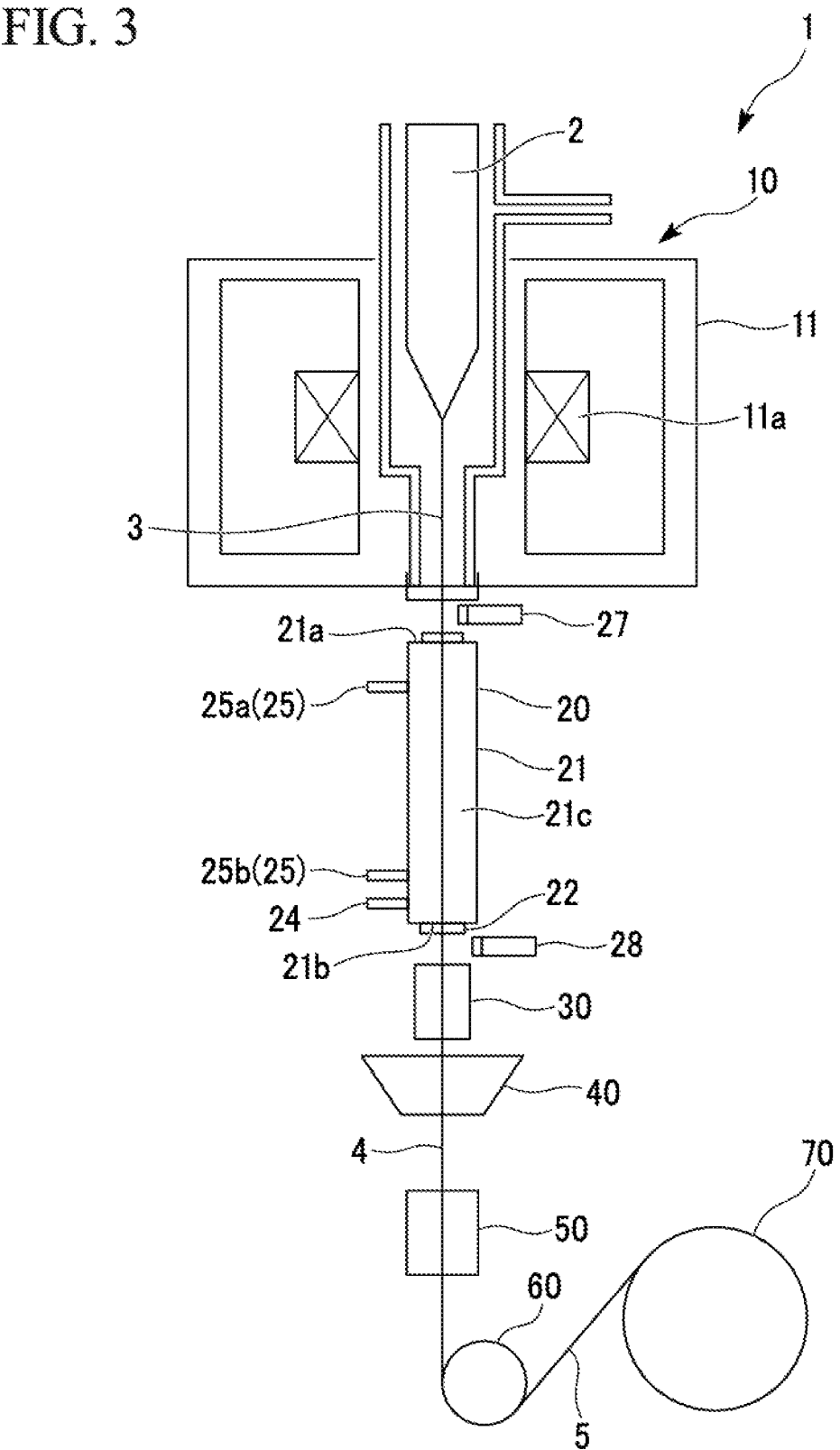
FIG. 3 is a schematic view showing a schematic configuration of a manufacturing apparatus capable of implementing another example of a method of manufacturing an optical fiber according to one embodiment of the invention.

FIG. 3 is a schematic view showing a schematic configuration of a manufacturing apparatus 101 capable of implementing another example of a method of manufacturing an optical fiber according to one embodiment of the invention.

The manufacturing apparatus 101 differs from the manufacturing apparatus 1 shown in FIG. 1 in that the slow-cooling device 20 is not connected to the heating furnace 11 but is separated from the heating furnace 11.

Similar to the manufacturing method using the manufacturing apparatus 1 shown in FIG. 1, even in a manufacturing method using the manufacturing apparatus 101, a pressure gradient increasing in a direction toward the outlet end 21b from the inlet end 21.a is provided inside the slow-cooling device 20 by adjusting at least one of a flow rate of the fluid (gas) introduced into the main body 21 from the gas inlet/outlet portion 24 and an inner diameter of the opening of the constrictor 22.

Accordingly, heat transfer between the glass fiber 3 and the fluid is gently performed such that a slow-cooling effect is sufficiently obtained, and thereby the optical fiber 5 with low transmission loss can be manufactured.

Also, in this manufacturing method as well, the above-described effect can be obtained without using a heat source (or using a simple heat source). Thus, the apparatus configuration is limited from being complicated.

While a method of manufacturing the optical fiber of the invention has been described, the invention is not limited to the above-described examples but can be modified as needed without departing from the scope of the invention.

For example, it is also possible that the pressure gradient inside the slow-cooling device 20 is measured, the measured value and a preset reference value of the pressure gradient are compared, and at least one of the flow rate of the fluid introduced into the slow-cooling device 20 and the inner diameter (an opening degree of the outlet) of the opening of the constrictor 22 is controlled such that the difference between the measured value and the preset reference value of the pressure gradient decreases. Feedback control such as proportional integral derivative (PID) control is preferable as a method of the control.

Therefore, the pressure gradient in the slow-cooling device 20 can be maintained within an appropriate range.

EXAMPLES

First, items common to the examples will be described.

As the optical fiber preform 2, a preform for a single-mode fiber including a clad mainly formed of a silica glass and a core region in which $GeO_2$ was added was used.

In the drawer 10, the optical fiber preform 2 was heated in the heating furnace 11, melted, and drawn, and the glass fiber 3 was thereby obtained (drawing step).

The glass fiber 3 was inserted into the main body 21 of the slow-cooling device 20 from the inlet end 21a toward the outlet end 21b thereof (slow cooling step).

In the slow cooling step, the inside of the slow-cooling device 20 was filled with Ar or $N_2$.

The temperature of the glass fiber 3 immediately before entering the slow-cooling device 20 was in the range of 1,200° C. to 1,500° C.

The temperature of the inner wall of the main body 21 of the slow-cooling device was always set to be lower than the temperature of the glass fiber 3.

The inner diameter of the main body 21 of the slow-cooling device 20 was any one of 20 mm, 38.7 mm, and 50 mm.

A value obtained by dividing a difference (a differential pressure ΔP) between the pressure measured by the first connection port 25a and the pressure measured by the first connection port 25a by a distance between the connection ports 25a and 25b (the distance in the axial direction of the main body 21) was calculated as the average pressure gradient (refer to Formula (8)). Also, the distance between the connection ports 25a and 25b was set such that the downstream direction in the fiber drawing direction (downward in FIG. 1) was normal.

The pressure gradient inside the slow-cooling device 20 was adjusted by adjusting the inner diameter of the opening of the constrictor 22 and an amount of the low thermal conductivity gas introduced from the gas inlet/outlet portion 23 or the gas inlet/outlet portion 24.

The temperature gradient of the glass fiber 3 passing through the slow-cooling device 20 was checked by the radiation thermometers 27 and 28.

The glass fiber 3 was cooled to 100° C. or less by the forced cooler 30 and was coated with an ultraviolet curing resin in the coater 40 (coating step).

Next, the coating layer was irradiated and cured with ultraviolet rays in the curing unit 50 to obtain the optical fiber 5 (curing step).

The optical fiber 5 was wound by the winder 70 via the folding pulley 60.

Transmission loss of the optical fiber 5 (wavelength 1.55 µm) was measured using an optical time domain reflectometer (OTDR).

Examples and reference examples will be described in detail below.

Example 1

The optical fiber 5 was manufactured using the manufacturing apparatus shown in FIG. 1.

The total length of the slow-cooling device 20 was set to 3 m. The inner diameter of the main body 21 was set to 38.7 mm. The inside of the slow-cooling device 20 (the main body 21) was filled with Ar.

The fiber drawing velocity was set to 2,200 m/min. The temperature of the glass fiber 3 immediately before entering the slow-cooling device 20 was set to approximately 1,400° C. The inner wall temperature of the main body 21 of the slow-cooling device 20 was set to 1,000° C.

The flow rate of Ar introduced from the gas inlet/outlet portions 23 and 24 and the inner diameter of the opening of the constrictor 22 were adjusted so that a pressure change in the axial direction of the slow-cooling device 20 was approximately 4.5 Pa/m.

The result of the measurement by the radiation thermometer 28 was that the temperature of the glass fiber 3 at the outlet of the slow-cooling device 20 was approximately 1,160° C.

Transmission loss of the optical fiber 5 (wavelength 1.55 µm) was 0.178 dB/km.

Example 2

The optical fiber 5 was manufactured using the manufacturing apparatus shown in FIG. 1.

The total length of the slow-cooling device 20 was set to 3 m. The inner diameter of the main body 21 of the slow-cooling device 20 was set to 20 mm. The inside of the slow-cooling device 20 (the main body 21) was filled with Ar.

The fiber drawing velocity was set to 2,200 m/min. The temperature of the glass fiber 3 immediately before entering the slow-cooling device 20 was set to approximately 1,400° C. The inner wall temperature of the main body 21 of the slow-cooling device 20 was set to 1,000° C.

The flow rate of Ar introduced from the gas inlet/outlet portions 23 and 24 and the inner diameter of the opening of the constrictor 22 were adjusted so that a pressure change in the axial direction of the slow-cooling device 20 was approximately 20 Pa/m. The other conditions were determined in accordance with Example 1.

The result of the measurement by the radiation thermometer 28 was that the temperature of the glass fiber 3 at the outlet of the slow-cooling device 20 was approximately 1,000° C.

Transmission loss of the optical fiber 5 was 0.180 dB/km.

Example 3

The optical fiber 5 was manufactured using the manufacturing apparatus shown in FIG. 1.

The total length of the slow-cooling device 20 was set to 3 m. The inner diameter of the main body 21 of the slow-cooling device 20 was set to 50 mm. The inside of the slow-cooling device 20 (the main body 21) was filled with Ar.

The fiber drawing velocity was set to 2,200 m/min. The temperature of the glass fiber 3 immediately before entering the slow-cooling device 20 was set to approximately 1,400°

C. The inner wall temperature of the main body 21 of the slow-cooling device 20 was set to 1,000° C.

The flow rate of Ar introduced from the gas inlet/outlet portions 23 and 24 and the inner diameter of the opening of the constrictor 22 were adjusted so that a pressure change in the axial direction of the slow-cooling device 20 was approximately 2.5 Pa/m. The other conditions were determined in accordance with Example 1.

The result of the measurement by the radiation thermometer 28 was that the temperature of the glass fiber 3 at the outlet of the slow-cooling device 20 was approximately 1.190° C.

Transmission loss of the optical fiber 5 was 0.178 dB/km.

Example 4

The optical fiber 5 was manufactured using the manufacturing apparatus shown in FIG. 1.

The total length of the slow-cooling device 20 was set to 1.5 m. The inner diameter of the main body 21 of the slow-cooling device 20 was set to 50 mm. The inside of the slow-cooling device 20 (the main body 21) was filled with Ar.

The fiber drawing velocity was set to 1,000 m/min. The temperature of the glass fiber 3 immediately before entering the slow-cooling device 20 was set to approximately 1,400° C. The inner wall temperature of the main body 21 of the slow-cooling device 20 was set to 1,000° C.

The flow rate of Ar introduced from the gas inlet/outlet portions 23 and 24 and the inner diameter of the opening of the constrictor 22 were adjusted so that a pressure change in the axial direction of the slow-cooling device 20 was approximately 2 Pa/m. The other conditions were determined in accordance with Example 1.

The result of the measurement by the radiation thermometer 28 was that the temperature of the glass fiber 3 at the outlet of the slow-cooling device 20 was approximately 1,220° C.

Transmission loss of the optical fiber 5 was 0.177 dB/km.

Example 5

The optical fiber 5 was manufactured using the manufacturing apparatus shown in FIG. 1.

The total length of the slow-cooling device 20 was set to 1.5 m. The inner diameter of the main body 21 of the slow-cooling device 20 was set to 20 mm. The inside of the slow-cooling device 20 (the main body 21) was filled with Ar.

The fiber drawing velocity was set to 1,000 m/min. The temperature of the glass fiber 3 immediately before entering the slow-cooling device 20 was set to approximately 1,400° C. The inner wall temperature of the main body 21 of the slow-cooling device 20 was set to 1,000° C.

The flow rate of Ar introduced from the gas inlet/outlet portions 23 and 24 and the inner diameter of the opening of the constrictor 22 were adjusted so that a pressure change in the axial direction of the slow-cooling device 20 was approximately 10 Pa/m. The other conditions were determined in accordance with Example 1.

The result of the measurement by the radiation thermometer 28 was that the temperature of the glass fiber 3 at the outlet of the slow-cooling device 20 was approximately 1,130° C.

Transmission loss of the optical fiber 5 was 0.180 dB/km.

Example 6

The optical fiber 5 was manufactured using the manufacturing apparatus shown in FIG. 3.

The total length of the slow-cooling device 20 was set to 3 m. The inner diameter of the main body 21 of the slow-cooling device 20 was set to 50 mm. The inside of the slow-cooling device 20 (the main body 21) was filled with air.

The fiber drawing velocity was set to 2,200 m/min. The temperature of the glass fiber 3 immediately before entering the slow-cooling device 20 was set to approximately 1.400° C. The inner wall temperature of the main body 21 of the slow-cooling device 20 was set to 1,000° C.

The flow rate of air introduced from the gas inlet/outlet portion 24 and the inner diameter of the opening of the constrictor 22 were adjusted so that a pressure change in the axial direction of the slow-cooling device 20 was approximately 9 Pa/m. The other conditions were determined in accordance with Example 1.

The result of the measurement by the radiation thermometer 28 was that the temperature of the glass fiber 3 at the outlet of the slow-cooling device 20 was approximately 1,160° C.

Transmission loss of the optical fiber 5 was 0.179 dB/km.

Example 7

The optical fiber 5 was manufactured using the manufacturing apparatus shown in FIG. 3.

The total length of the slow-cooling device 20 was set to 3 m. The inner diameter of the main body 21 of the slow-cooling device 20 was set to 50 mm. The inside of the slow-cooling device 20 (the main body 21) was filled with air.

The fiber drawing velocity was set to 2.200 m/min. The temperature of the glass fiber 3 immediately before entering the slow-cooling device 20 was set to approximately 1,400° C. The inner wall temperature of the main body 21 of the slow-cooling device 20 was set to 1,000° C.

The flow rate of air introduced from the gas inlet/outlet portion 24 and the inner diameter of the opening of the constrictor 22 were adjusted so that a pressure change in the axial direction of the slow-cooling device 20 was approximately 70 Pa/m. The other conditions were determined in accordance with Example 1.

The result of the measurement by the radiation thermometer 28 was that the temperature of the glass fiber 3 at the outlet of the slow-cooling device 20 was approximately 1,070° C.

Transmission loss of the optical fiber 5 was 0.181 dB/km.

Example 8

The optical fiber 5 was manufactured using the manufacturing apparatus shown in FIG. 3.

The total length of the slow-cooling device 20 was set to 3 m. The inner diameter of the main body 21 of the slow-cooling device 20 was set to 50 mm. The inside of the slow-cooling device 20 (the main body 21) was filled with air.

The fiber drawing velocity was set to 2,200 n/min. The temperature of the glass fiber 3 immediately before entering the slow-cooling device 20 was set to approximately 1,400° C. The inner wall temperature of the main body 21 of the slow-cooling device 20 was set to 400° C.

The flow rate of air introduced from the gas inlet/outlet portion 24 and the inner diameter of the opening of the constrictor 22 were adjusted so that a pressure change in the axial direction of the slow-cooling device 20 was approximately 2 Pa/m. The other conditions were determined in accordance with Example 1.

The result of the measurement by the radiation thermometer 28 was that the temperature of the glass fiber 3 at the outlet of the slow-cooling device 20 was approximately 980° C.

Transmission loss of the optical fiber 5 was 0.183 dB/km.

Example 9

The optical fiber 5 was manufactured using the manufacturing apparatus shown in FIG. 3.

The total length of the slow-cooling device 20 was set to 3 m. The inner diameter of the main body 21 of the slow-cooling device 20 was set to 20 mm. The inside of the slow-cooling device 20 (the main body 21) was filled with air.

The fiber drawing velocity was set to 2,200 m/min. The temperature of the glass fiber 3 immediately before entering the slow-cooling device 20 was set to approximately 1,400° C. The inner wall temperature of the main body 21 of the slow-cooling device 20 was set to 400° C.

The flow rate of air introduced from the gas inlet/outlet portion 24 and the inner diameter of the opening of the constrictor 22 were adjusted so that a pressure change in the axial direction of the slow-cooling device 20 was approximately 15 Pa/m. The other conditions were determined in accordance with Example 1.

The result of the measurement by the radiation thermometer 28 was that the temperature of the glass fiber 3 at the outlet of the slow-cooling device 20 was approximately 800° C.

Transmission loss of the optical fiber 5 was 0.184 dB/km.

Reference Example 1

The optical fiber 5 was manufactured using the manufacturing apparatus shown in FIG. 1.

The total length of the slow-cooling device 20 was set to 3 m. The inner diameter of the main body 21 of the slow-cooling device 20 was set to 38.7 mm. The inside of the slow-cooling device 20 (the main body 21) was filled with Ar.

The fiber drawing velocity was set to 2,200 m/min. The temperature of the glass fiber 3 immediately before entering the slow-cooling device 20 was set to approximately 1,400° C. The inner wall temperature of the main body 21 of the slow-cooling device 20 was set to 1,000° C.

The flow rate of Ar introduced from the gas inlet/outlet portions 23 and 24 and the inner diameter of the opening of the constrictor 22 were adjusted so that a pressure change in the axial direction of the slow-cooling device 20 was approximately 0 Pa/m. The other conditions were determined in accordance with Example 1.

The result of the measurement by the radiation thermometer 28 was that the temperature of the glass fiber 3 at the outlet of the slow-cooling device 20 was approximately 920° C.

Transmission loss of the optical fiber 5 was 0.184 dB/km.

Reference Example 2

The optical fiber 5 was manufactured using the manufacturing apparatus shown in FIG. 1.

The total length of the slow-cooling device 20 was set to 3 m. The inner diameter of the main body 21 of the slow-cooling device 20 was set to 20 mm. The inside of the slow-cooling device 20 (the main body 21) was filled with Ar.

The fiber drawing velocity was set to 2,200 m/min. The temperature of the glass fiber 3 immediately before entering the slow-cooling device 20 was set to approximately 1,400° C. The inner wall temperature of the main body 21 of the slow-cooling device 20 was set to 1,000° C.

The flow rate of Ar introduced from the gas inlet/outlet portions 23 and 24 and the inner diameter of the opening of the constrictor 22 were adjusted so that a pressure change in the axial direction of the slow-cooling device 20 was approximately 0 Pa/m. The other conditions were determined in accordance with Example 1.

The result of the measurement by the radiation thermometer 28 was that the temperature of the glass fiber 3 at the outlet of the slow-cooling device 20 was approximately 950° C.

Transmission loss of the optical fiber 5 was 0.184 dB/km.

Reference Example 3

The optical fiber 5 was manufactured using the manufacturing apparatus shown in FIG. 1.

The total length of the slow-cooling device 20 was set to 3 m. The inner diameter of the main body 21 of the slow-cooling device 20 was set to 50 mm. The inside of the slow-cooling device 20 (the main body 21) was filled with Ar.

The fiber drawing velocity was set to 2,200 m/min. The temperature of the glass fiber 3 immediately before entering the slow-cooling device 20 was set to approximately 1,400° C. The inner wall temperature of the main body 21 of the slow-cooling device 20 was set to 1,000° C.

The flow rate of Ar introduced from the gas inlet/outlet portions 23 and 24 and the inner diameter of the opening of the constrictor 22 were adjusted so that a pressure change in the axial direction of the slow-cooling device 20 was approximately 0 Pa/m. The other conditions were determined in accordance with Example 1.

The result of the measurement by the radiation thermometer 28 was that the temperature of the glass fiber 3 at the outlet of the slow-cooling device 20 was approximately 710° C.

Transmission loss of the optical fiber 5 was 0.186 dB/km.

Reference Example 4

The optical fiber 5 was manufactured using the manufacturing apparatus shown in FIG. 1.

The total length of the slow-cooling device 20 was set to 1.5 m. The inner diameter of the main body 21 of the slow-cooling device 20 was set to 50 mm. The inside of the slow-cooling device 20 (the main body 21) was filled with Ar.

The fiber drawing velocity was set to 1,000 m/min. The temperature of the glass fiber 3 immediately before entering the slow-cooling device 20 was set to approximately 1,400° C. The inner wall temperature of the main body 21 of the slow-cooling device 20 was set to 1,000° C.

The flow rate of Ar introduced from the gas inlet/outlet portions 23 and 24 and the inner diameter of the opening of the constrictor 22 were adjusted so that a pressure change in the axial direction of the slow-cooling device 20 was approximately 0 Pa/m. The other conditions were determined in accordance with Example 1.

The result of the measurement by the radiation thermometer 28 was that the temperature of the glass fiber 3 at the outlet of the slow-cooling device 20 was approximately 950° C.

Transmission loss of the optical fiber 5 was 0.184 dB/km.

Reference Example 5

The optical fiber 5 was manufactured using the manufacturing apparatus shown in FIG. 1.

The total length of the slow-cooling device 20 was set to 1.5 m. The inner diameter of the main body 21 of the slow-cooling device 20 was set to 20 mm. The inside of the slow-cooling device 20 (the main body 21) was filled with Ar.

The fiber drawing velocity was set to 1,000 m/min. The temperature of the glass fiber 3 immediately before entering the slow-cooling device 20 was set to approximately 1,400° C. The inner wall temperature of the main body 21 of the slow-cooling device 20 was set to 1,000° C.

The flow rate of Ar introduced from the gas inlet/outlet portion 24 and the inner diameter of the opening of the constrictor 22 were adjusted so that a pressure change in the axial direction of the slow-cooling device 20 was approximately 0 Pa/m. The other conditions were determined in accordance with Example 1.

The result of the measurement by the radiation thermometer 28 was that the temperature of the glass fiber 3 at the outlet of the slow-cooling device 20 was approximately 980° C.

Transmission loss of the optical fiber 5 was 0.184 dB/km.

Reference Example 6

The optical fiber 5 was manufactured using the manufacturing apparatus shown in FIG. 3.

The total length of the slow-cooling device 20 was set to 3 m. The inner diameter of the main body 21 of the slow-cooling device 20 was set to 50 mm. The inside of the slow-cooling device 20 (the main body 21) was filled with air.

The fiber drawing velocity was set to 2,200 m/min. The temperature of the glass fiber 3 immediately before entering the slow-cooling device 20 was set to approximately 1,400° C. The inner wall temperature of the main body 21 of the slow-cooling device 20 was set to 1,000° C.

The flow rate of air introduced from the gas inlet/outlet portion 24 and the inner diameter of the opening of the constrictor 22 were adjusted so that a pressure change in the axial direction of the slow-cooling device 20 was approximately 0 Pa/m. The other conditions were determined in accordance with Example 1.

The result of the measurement by the radiation thermometer 28 was that the temperature of the glass fiber 3 at the outlet of the slow-cooling device 20 was approximately 800° C.

Transmission loss of the optical fiber 5 was 0.185 dB/km.

Reference Example 7

The optical fiber 5 was manufactured using the manufacturing apparatus shown in FIG. 3.

The total length of the slow-cooling device 20 was set to 3 m. The inner diameter of the main body 21 of the slow-cooling device 20 was set to 50 mm. The inside of the slow-cooling device 20 (the main body 21) was filled with air.

The fiber drawing velocity was set to 2,200 m/min. The temperature of the glass fiber 3 immediately before entering the slow-cooling device 20 was set to approximately 1,400° C. The inner wall temperature of the main body 21 of the slow-cooling device 20 was set to 1,000° C.

The flow rate of air introduced from the gas inlet/outlet portion 24 and the inner diameter of the opening of the constrictor 22 were adjusted so that a pressure change in the axial direction of the slow-cooling device 20 was approximately 0 Pa/m. The other conditions were determined in accordance with Example 1.

The result of the measurement by the radiation thermometer 28 was that the temperature of the glass fiber 3 at the outlet of the slow-cooling device 20 was approximately 860° C.

Transmission loss of the optical fiber 5 was 0.185 dB/km.

Reference Example 8

The optical fiber 5 was manufactured using the manufacturing apparatus shown in FIG. 3.

The total length of the slow-cooling device 20 was set to 3 m. The inner diameter of the main body 21 of the slow-cooling device 20 was set to 50 mm. The inside of the slow-cooling device 20 (the main body 21) was filled with air.

The fiber drawing velocity was set to 2,200 m/min. The temperature of the glass fiber 3 immediately before entering the slow-cooling device 20 was set to approximately 1,400° C. The inner wall temperature of the main body 21 of the slow-cooling device 20 was set to 400° C.

The flow rate of air introduced from the gas inlet/outlet portion 24 and the inner diameter of the opening of the constrictor 22 were adjusted so that a pressure change in the axial direction of the slow-cooling device 20 was approximately 0 Pa/m. The other conditions were determined in accordance with Example 1.

The result of the measurement by the radiation thermometer 28 was that the temperature of the glass fiber 3 at the outlet of the slow-cooling device 20 was approximately 680° C.

Transmission loss of the optical fiber 5 was 0.187 dB/km.

Reference Example 9

The optical fiber 5 was manufactured using the manufacturing apparatus shown in FIG. 3.

The total length of the slow-cooling device 20 was set to 3 m. The inner diameter of the main body 21 of the slow-cooling device 20 was set to 20 mm. The inside of the slow-cooling device 20 (the main body 21) was filled with air.

The fiber drawing velocity was set to 2,200 m/min. The temperature of the glass fiber 3 immediately before entering the slow-cooling device 20 was set to approximately 1,400° C. The inner wall temperature of the main body 21 of the slow-cooling device 20 was set to 400° C.

The flow rate of air introduced from the gas inlet/outlet portion 24 and the inner diameter of the opening of the constrictor 22 were adjusted so that a pressure change in the axial direction of the slow-cooling device 20 was approximately 0 Pa/m. The other conditions were determined in accordance with Example 1.

The result of the measurement by the radiation thermometer 28 was that the temperature of the glass fiber 3 at the outlet of the slow-cooling device 20 was approximately 680° C.

Transmission loss of the optical fiber 5 was 0.187 dB/km.

Reference Example 10

The optical fiber 5 was manufactured using the manufacturing apparatus shown in FIG. 1.

The total length of the slow-cooling device 20 was set to 3 m. The inner diameter of the main body 21 of the slow-cooling device 20 was set to 38.7 mm. The inside of the slow-cooling device 20 (the main body 21) was filled with Ar.

The fiber drawing velocity was set to 2,200 m/min. The temperature of the glass fiber 3 immediately before entering the slow-cooling device 20 was set to approximately 1,400° C. The inner wall temperature of the main body 21 of the slow-cooling device 20 was set to 1,000° C.

The flow rate of Ar introduced from the gas inlet/outlet portions 23 and 24 and the inner diameter of the opening of the constrictor 22 were adjusted so that a pressure change in the axial direction of the slow-cooling device 20 was approximately 45 Pa/m. The other conditions were determined in accordance with Example 1.

The result of the measurement by the radiation thermometer 28 was that the temperature of the glass fiber 3 at the outlet of the slow-cooling device 20 was approximately 870° C.

Transmission loss of the optical fiber 5 was 0.185 dB/km.

Reference Example 11

The optical fiber 5 was manufactured using the manufacturing apparatus shown in FIG. 1.

The total length of the slow-cooling device 20 was set to 3 m. The inner diameter of the main body 21 of the slow-cooling device 20 was set to 20 mm. The inside of the slow-cooling device 20 (the main body 21) was filled with Ar.

The fiber drawing velocity was set to 2,200 m/min. The temperature of the glass fiber 3 immediately before entering the slow-cooling device 20 was set to approximately 1,400° C. The inner wall temperature of the main body 21 of the slow-cooling device 20 was set to 1,000° C.

The flow rate of Ar introduced from the gas inlet/outlet portions 23 and 24 and the inner diameter of the opening of the constrictor 22 were adjusted so that a pressure change in the axial direction of the slow-cooling device 20 was approximately 200 Palm. The other conditions were determined in accordance with Example 1.

The result of the measurement by the radiation thermometer 28 was that the temperature of the glass fiber 3 at the outlet of the slow-cooling device 20 was approximately 900° C.

Transmission loss of the optical fiber 5 was 0.186 dB/km.

Reference Example 12

The optical fiber 5 was manufactured using the manufacturing apparatus shown in FIG. 1.

The total length of the slow-cooling device 20 was set to 3 m. The inner diameter of the main body 21 of the slow-cooling device 20 was set to 50 mm. The inside of the slow-cooling device 20 (the main body 21) was filled with Ar.

The fiber drawing velocity was set to 2.200 m/min. The temperature of the glass fiber 3 immediately before entering the slow-cooling device 20 was set to approximately 1,400° C. The inner wall temperature of the main body 21 of the slow-cooling device 20 was set to 1,000° C.

The flow rate of Ar introduced from the gas inlet/outlet portions 23 and 24 and the inner diameter of the opening of the constrictor 22 were adjusted so that a pressure change in the axial direction of the slow-cooling device 20 was approximately 25 Pa/m. The other conditions were determined in accordance with Example 1.

The result of the measurement by the radiation thermometer 28 was that the temperature of the glass fiber 3 at the outlet of the slow-cooling device 20 was approximately 670° C.

Transmission loss of the optical fiber 5 was 0.186 dB/km.

Reference Example 13

The optical fiber 5 was manufactured using the manufacturing apparatus shown in FIG. 1.

The total length of the slow-cooling device 20 was set to 1.5 m. The inner diameter of the main body 21 of the slow-cooling device 20 was set to 50 mm. The inside of the slow-cooling device 20 (the main body 21) was filled with Ar.

The fiber drawing velocity was set to 1,000 m/min. The temperature of the glass fiber 3 immediately before entering the slow-cooling device 20 was set to approximately 1,400° C. The inner wall temperature of the main body 21 of the slow-cooling device 20 was set to 1,000° C.

The flow rate of Ar introduced from the gas inlet/outlet portions 23 and 24 and the inner diameter of the opening of the constrictor 22 were adjusted so that a pressure change in the axial direction of the slow-cooling device 20 was approximately 20 Pa/m. The other conditions were determined in accordance with Example 1.

The result of the measurement by the radiation thermometer 28 was that the temperature of the glass fiber 3 at the outlet of the slow-cooling device 20 was approximately 900° C.

Transmission loss of the optical fiber 5 was 0.185 dB/km.

Reference Example 14

The optical fiber 5 was manufactured using the manufacturing apparatus shown in FIG. 3.

The total length of the slow-cooling device 20 was set to 1.5 m. The inner diameter of the main body 21 of the slow-cooling device 20 was set to 20 mm. The inside of the slow-cooling device 20 (the main body 21) was filled with Ar.

The fiber drawing velocity was set to 1,000 m/min. The temperature of the glass fiber 3 immediately before entering the slow-cooling device 20 was set to approximately 1.400° C. The inner wall temperature of the main body 21 of the slow-cooling device 20 was set to 1,000° C.

The flow rate of Ar introduced from the gas inlet/outlet portion 24 and the inner diameter of the opening of the constrictor 22 were adjusted so that a pressure change in the axial direction of the slow-cooling device 20 was approximately 20 Palm. The other conditions were determined in accordance with Example 1.

The result of the measurement by the radiation thermometer 28 was that the temperature of the glass fiber 3 at the outlet of the slow-cooling device 20 was approximately 930° C.

Transmission loss of the optical fiber 5 was 0.185 dB/km.

Reference Example 15

The optical fiber 5 was manufactured using the manufacturing apparatus shown in FIG. 3.

The total length of the slow-cooling device 20 was set to 3 m. The inner diameter of the main body 21 of the slow-cooling device 20 was set to 50 mm. The inside of the slow-cooling device 20 (the main body 21) was filled with air.

The fiber drawing velocity was set to 2,200 m/min. The temperature of the glass fiber 3 immediately before entering the slow-cooling device 20 was set to approximately 1,400° C. The inner wall temperature of the main body 21 of the slow-cooling device 20 was set to 1,000° C.

The flow rate of air introduced from the gas inlet/outlet portion 24 and the inner diameter of the opening of the constrictor 22 were adjusted so that a pressure change in the axial direction of the slow-cooling device 20 was approximately 90 Pa/m. The other conditions were determined in accordance with Example 1.

The result of the measurement by the radiation thermometer 28 was that the temperature of the glass fiber 3 at the outlet of the slow-cooling device 20 was approximately 750° C.

Transmission loss of the optical fiber 5 was 0.186 dB/km.

Reference Example 16

The optical fiber 5 was manufactured using the manufacturing apparatus shown in FIG. 3.

The total length of the slow-cooling device 20 was set to 3 m. The inner diameter of the main body 21 of the slow-cooling device 20 was set to 50 mm. The inside of the slow-cooling device 20 (the main body 21) was filled with air.

The fiber drawing velocity was set to 2,200 m/min. The temperature of the glass fiber 3 immediately before entering the slow-cooling device 20 was set to approximately 1,400° C. The inner wall temperature of the main body 21 of the slow-cooling device 20 was set to 1,000° C.

The flow rate of air introduced from the gas inlet/outlet portion 24 and the inner diameter of the opening of the constrictor 22 were adjusted so that a pressure change in the axial direction of the slow-cooling device 20 was approximately 300 Pa/n. The other conditions were determined in accordance with Example 1.

The result of the measurement by the radiation thermometer 28 was that the temperature of the glass fiber 3 at the outlet of the slow-cooling device 20 was approximately 810° C.

Transmission loss of the optical fiber 5 was 0.186 dB/km.

Reference Example 17

The optical fiber 5 was manufactured using the manufacturing apparatus shown in FIG. 3.

The total length of the slow-cooling device 20 was set to 3 m. The inner diameter of the main body 21 of the slow-cooling device 20 was set to 50 mm. The inside of the slow-cooling device 20 (the main body 21) was filled with air.

The fiber drawing velocity was set to 2,200 m/min. The temperature of the glass fiber 3 immediately before entering the slow-cooling device 20 was set to approximately 1,400° C. The inner wall temperature of the main body 21 of the slow-cooling device 20 was set to 400° C.

The flow rate of air introduced from the gas inlet/outlet portion 24 and the inner diameter of the opening of the constrictor 22 were adjusted so that a pressure change in the axial direction of the slow-cooling device 20 was approximately 20 Palm. The other conditions were determined in accordance with Example 1.

The result of the measurement by the radiation thermometer 28 was that the temperature of the glass fiber 3 at the outlet of the slow-cooling device 20 was approximately 650° C.

Transmission loss of the optical fiber 5 was 0.187 dB/km.

Reference Example 18

The optical fiber 5 was manufactured using the manufacturing apparatus shown in FIG. 3.

The total length of the slow-cooling device 20 was set to 3 m. The inner diameter of the main body 21 of the slow-cooling device 20 was set to 20 mm. The inside of the slow-cooling device 20 (the main body 21) was filled with air.

The fiber drawing velocity was set to 2,200 m/min. The temperature of the glass fiber 3 immediately before entering the slow-cooling device 20 was set to approximately 1,400° C. The inner wall temperature of the main body 21 of the slow-cooling device 20 was set to 400° C.

The flow rate of air introduced from the gas inlet/outlet portion 24 and the inner diameter of the opening of the constrictor 22 were adjusted so that a pressure change in the axial direction of the slow-cooling device 20 was approximately 190 Palm. The other conditions were determined in accordance with Example 1.

The result of the measurement by the radiation thermometer 28 was that the temperature of the glass fiber 3 at the outlet of the slow-cooling device 20 was approximately 640° C.

Transmission loss of the optical fiber 5 was 0.187 dB/km.

Conditions of the examples are shown in Table 1. Conditions of the reference examples are shown in Table 2.

$(\pi D^2/4) \times dP/dL$ was calculated when an inner diameter (a tube inner diameter) of the main body 21 of the slow-cooling device 20 is defined as D [m] and the distance in the axial direction of the internal space 21c of the slow-cooling device 20 (the length of the slow-cooling device) is defined as L [m].

TABLE 1

| EXAMPLE | REFERENCE DRAWING | ATMOSPHERE GAS | DRAWING VELOCITY [m/min] | TUBE INNER DIAMETER [mm] | LENGTH OF SLOW-COOLING DEVICE [m] | PRESSURE CHANGE [Pa/m] |
|---|---|---|---|---|---|---|
| 1 | 1 | Ar | 2200 | 38.7 | 3 | 4.5 |
| 2 | 1 | Ar | 2200 | 20 | 3 | 20 |
| 3 | 1 | Ar | 2200 | 50 | 3 | 2.5 |
| 4 | 1 | Ar | 1000 | 50 | 1.5 | 2 |
| 5 | 1 | Ar | 1000 | 20 | 1.5 | 10 |

TABLE 1-continued

| | | | | | | |
|---|---|---|---|---|---|---|
| 6 | 3 | AIR | 2200 | 50 | 3 | 9 |
| 7 | 3 | AIR | 2200 | 20 | 3 | 70 |
| 8 | 3 | AIR | 2200 | 50 | 3 | 2 |
| 9 | 3 | AIR | 2200 | 20 | 3 | 15 |

| EXAMPLE | $(\pi D^2/4) \times dP/dL$ | FIBER TEMPERATURE AT INLET OF SLOW-COOLING DEVICE [° C.] | FIBER TEMPERATURE AT OUTLET OF SLOW-COOLING DEVICE [° C.] | INNER WALL TEMPERATURE OF SLOW-COOLING DEVICE [° C.] |
|---|---|---|---|---|
| 1 | 0.005 | 1400 | 1160 | 1000 |
| 2 | 0.006 | 1400 | 1100 | 1000 |
| 3 | 0.005 | 1400 | 1190 | 1000 |
| 4 | 0.004 | 1400 | 1220 | 1000 |
| 5 | 0.003 | 1400 | 1130 | 1000 |
| 6 | 0.018 | 1400 | 1160 | 1000 |
| 7 | 0.022 | 1400 | 1070 | 1000 |
| 8 | 0.004 | 1400 | 980 | 400 |
| 9 | 0.005 | 1400 | 900 | 400 |

TABLE 2

| REFERENCE EXAMPLE | REFERENCE DRAWING | ATMOSPHERE GAS | DRAWING VELOCITY [m/min] | TUBE INNER DIAMETER [mm] | LENGTH OF SLOW-COOLING DEVICE [m] | PRESSURE CHANGE [Pa/m] |
|---|---|---|---|---|---|---|
| 1 | 1 | Ar | 2200 | 38.7 | 3 | 0 |
| 2 | 1 | Ar | 2200 | 20 | 3 | 0 |
| 3 | 1 | Ar | 2200 | 50 | 3 | 0 |
| 4 | 1 | Ar | 1000 | 50 | 1.5 | 0 |
| 5 | 1 | Ar | 1000 | 20 | 1.5 | 0 |
| 6 | 3 | AIR | 2200 | 50 | 3 | 0 |
| 7 | 3 | AIR | 2200 | 20 | 3 | 0 |
| 8 | 3 | AIR | 2200 | 50 | 3 | 0 |
| 9 | 3 | AIR | 2200 | 20 | 3 | 0 |
| 10 | 1 | Ar | 2200 | 38.7 | 3 | 45 |
| 11 | 1 | Ar | 2200 | 20 | 3 | 200 |
| 12 | 1 | Ar | 2200 | 50 | 3 | 25 |
| 13 | 1 | Ar | 1000 | 50 | 1.5 | 20 |
| 14 | 1 | Ar | 1000 | 20 | 1.5 | 190 |
| 15 | 3 | AIR | 2200 | 50 | 3 | 90 |
| 16 | 3 | AIR | 2200 | 20 | 3 | 300 |
| 17 | 3 | AIR | 2200 | 50 | 3 | 20 |
| 18 | 3 | AIR | 2200 | 20 | 3 | 190 |

| REFERENCE EXAMPLE | $(\pi D^2/4) \times dP/dL$ | FIBER TEMPERATURE AT INLET OF SLOW-COOLING DEVICE [° C.] | FIBER TEMPERATURE AT OUTLET OF SLOW-COOLING DEVICE [° C.] | INNER WALL TEMPERATURE OF SLOW-COOLING DEVICE [° C.] |
|---|---|---|---|---|
| 1 | 0 | 1400 | 920 | 1000 |
| 2 | 0 | 1400 | 950 | 1000 |
| 3 | 0 | 1400 | 710 | 1000 |
| 4 | 0 | 1400 | 950 | 1000 |
| 5 | 0 | 1400 | 980 | 1000 |
| 6 | 0 | 1400 | 800 | 1000 |
| 7 | 0 | 1400 | 860 | 1000 |
| 8 | 0 | 1400 | 680 | 400 |
| 9 | 0 | 1400 | 680 | 400 |
| 10 | 0.063 | 1400 | 870 | 1000 |
| 11 | 0.063 | 1400 | 900 | 1000 |
| 12 | 0.049 | 1400 | 670 | 1000 |
| 13 | 0.039 | 1400 | 900 | 1000 |
| 14 | 0.060 | 1400 | 930 | 1000 |
| 15 | 0.177 | 1400 | 750 | 1000 |
| 16 | 0.094 | 1400 | 810 | 1000 |
| 17 | 0.039 | 1400 | 650 | 400 |
| 18 | 0.060 | 1400 | 640 | 400 |

Figure 4:
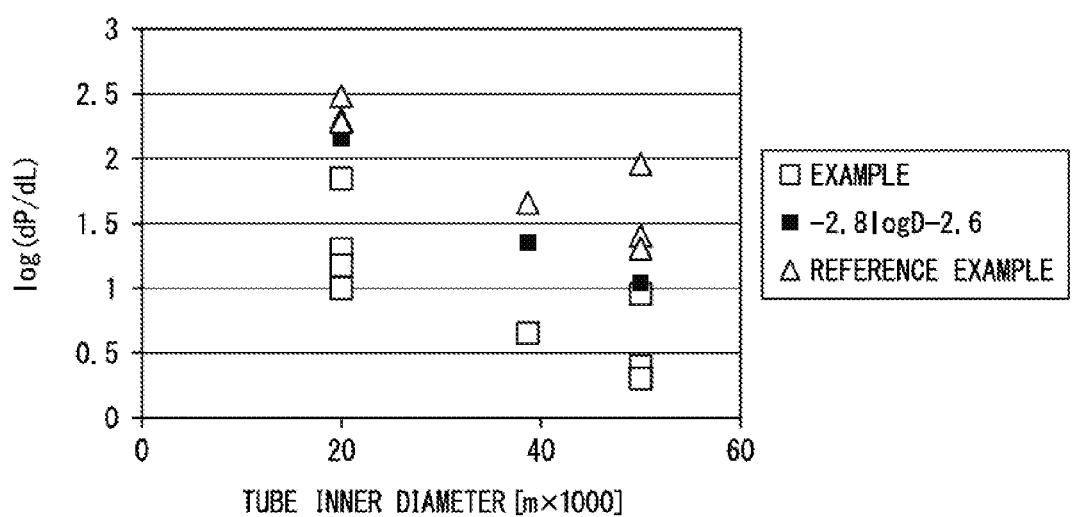
FIG. 4 is a diagram showing a test result.

FIG. 4 is a diagram showing a correlation between the tube inner diameter D of the slow-cooling device 20 and log(dP/dL).

As shown in this figure, the average pressure gradient dP/dL satisfies above-described Formula (11) in Examples 1 to 9.

From the results of the examples and reference examples, it is confirmed that, in Examples 1 to 9, the optical fiber 5 with low transmission loss can be manufactured by providing a pressure change increasing from the inlet end 21a toward the outlet end 21b in the slow-cooling device 20.

DESCRIPTION OF REFERENCE NUMERAL 1, 101 optical fiber manufacturing apparatus
2 optical fiber preform
3 glass fiber (bare optical fiber)
5 optical fiber
10 drawer
11 heating furnace
20 slow-cooling device
21a inlet end
21b outlet end
22 constrictor

What is claimed is:

1. A method of manufacturing an optical fiber comprising:
melting and drawing an optical fiber preform to form a glass fiber in a drawer;
cooling the glass fiber while inserting the glass fiber into a tubular cooling device separated apart from the drawer with a gap therebetween and providing a temperature gradient to the glass fiber from an inlet end toward an outlet end thereof; and
lowering an inner wall temperature of the tubular cooling device below a temperature of the glass fiber and providing a pressure gradient in which a pressure increases in a direction from the inlet end toward the outlet end inside the tubular cooling device when cooling the glass fiber,
wherein an average pressure change dP/dL [Pa/m] in a moving direction of the glass fiber inside the tubular cooling device satisfies the following Formula (1) when a tube inner diameter of the tubular cooling device is defined as D [m] and a length of an internal space of the tubular cooling device in the moving direction of the glass fiber is defined as L [m]

$$0.001 \leq (\pi D^2/4) \times dP/dL \leq 0.03 \quad (1).$$

2. The method of manufacturing an optical fiber according to claim 1, wherein the average pressure change dP/dL satisfies the following Formula (2)

$$0 \leq \log\left(\frac{dP}{dL}\right) \leq -2.8\log D - 2.6. \quad (2)$$

3. The method of manufacturing an optical fiber according to claim 1, wherein by adjusting at least one of a flow rate of a fluid introduced into the tubular cooling device and an opening degree of the outlet of the tubular cooling device, the pressure gradient is provided inside the tubular cooling device.

4. The method of manufacturing an optical fiber according to claim 1, wherein the pressure gradient inside the tubular cooling device is measured, the measured value of the pressure gradient and a preset reference value of the pressure gradient are compared, and at least one of a flow rate of a fluid introduced into the tubular cooling device and an opening degree of the outlet of the tubular cooling device is controlled such that a difference between the measured value and the preset reference value of the pressure gradient decreases.

5. The method of manufacturing an optical fiber according to claim 1, wherein when cooling the glass fiber, lowering an inner wall temperature of the tubular cooling device below a temperature of the glass fiber at the inlet end and a temperature of the glass fiber at the outlet end of the tubular cooling device.

6. The method of manufacturing an optical fiber according to claim 1, further comprising decreasing heat transfer between an inner wall of the tubular cooling device and a fluid introduced inside the tubular cooling device to prevent heat of the fluid from escaping to an outside of the tubular cooling device.

* * * * *